Patented Dec. 7, 1926.

1,609,703

UNITED STATES PATENT OFFICE.

JOHN EGGERT, OF BERLIN-FRIEDENAU, AND PAUL MENDELSSOHN-BARTHOLDY, OF BERLIN, GERMANY, ASSIGNORS TO I. G. FARBENINDUSTRIE AKTIENGESELLSCHAFT, OF FRANKFORT, GERMANY.

X-RAY PHOTOGRAPHY.

No Drawing. Application filed December 24, 1923, Serial No. 682,546, and in Germany March 21, 1923.

This invention relates to an improvement in the art of taking X-ray photographs. Normally a certain period of exposure is necessary in order to a secure a photograph of a desired intensity; it is not, however, always convenient to give prolonged exposures, and in many cases it is important to reduce the time of exposure considerably. The period of exposure may be decreased by taking advantage of the small loss in energy which X-rays suffer in passing through the material of which photographic plates and films are usually composed. Thus it is possible to expose simultaneously to the action of X-rays a number of separate, superimposed photographic plates or films. If the time of exposure be decreased below that usually necessary, there is obtained a number of identical negatives, all strongly under-exposed. When, however, these negatives are coincidently superimposed and held to the light, there is obtained a single, and extraordinarily effective picture.

According to the invention the X-ray photograph is taken on a packet of photographic films each coated with suitable photographic emulsion. The packet may comprise any suitable number of the films held together closely and so firmly that they cannot suffer any relative displacement during the exposure. Instead of forming the film packet from several individual films held in position for instance by frames, clips, gumming at the edges, a film of suitable dimensions to produce the desired packet may be folded, in which case the various elements of the composite picture form a single piece, which can be unfolded for development and subsequently refolded to produce the composite picture. If, however, the packet is formed of single films, they are separated from each other for development after the exposure and after development united again by any suitable holding-device to produce a composite photograph in a very handy form.

In addition to films sensitive to light the packet may also include intensifying plates used in X-ray photography. The films and the intensifying plates may be distributed in the packet in a suitable succession.

Having now described our invention what we claim is—

1. Method of taking X-ray photographs, which consists in simultaneously exposing a plurality of superimposed photographic films for a time interval less than required for a normal exposure, developing the impressions on the films and superimposing the pictures in the exact relation in which the exposures were made.

2. In a method of taking X-ray photographs, the steps which consists in underexposing a plurality of films as a unit in superimposed relation and placing the films after development in exactly the same superimposed relation in which they were during the exposure.

3. An X-ray film package capable when subjected to a relatively short exposure of providing the equivalent of a single fully-exposed film, said package comprising a plurality of closely superposed films restrained against relative displacement, the number of films bearing such inverse ratio to the degree of permissible underexposure of the package that when the separate strongly underexposed films are developed and superposed the assembled films give substantially the effect of a single fully-exposed film.

4. A plurality of sharply underexposed X-ray films resulting from a single exposure in closely superposed relation, the number of underexposed films having such relationship to the degree of underexposure of each film that the assembled films give an effect substantially equivalent to that of a single fully-exposed film.

5. A plurality of sharply underexposed X-ray films in superposed relationship, said films resulting from a single and relatively short exposure of the films in closely superposed relation, the number of the films and the degree of underexposure of the several films being so chosen that the composite effect of the assembled films is substantially the equivalent of that of a single fully-exposed film.

In testimony whereof we affix our signatures.

Dr. JOHN EGGERT.
PAUL MENDELSSOHN-BARTHOLDY.